(12) United States Patent
Martin et al.

(10) Patent No.: US 10,586,364 B2
(45) Date of Patent: Mar. 10, 2020

(54) METHODS AND SYSTEMS FOR DECORATING AND EMBELLISHING A DIGITAL OBJECT LAYOUT

(71) Applicants: Laurent Francois Martin, Carlsbad, CA (US); Narendra Dubey, San Francisco, CA (US); Jean Pierre Gehrig, Ayent (CH); John Bryce Ingram, Martigny (CH)

(72) Inventors: Laurent Francois Martin, Carlsbad, CA (US); Narendra Dubey, San Francisco, CA (US); Jean Pierre Gehrig, Ayent (CH); John Bryce Ingram, Martigny (CH)

( * ) Notice: Subject to any disclaimer, the term of this patent is extended or adjusted under 35 U.S.C. 154(b) by 0 days.

(21) Appl. No.: 16/234,154

(22) Filed: Dec. 27, 2018

(65) Prior Publication Data
US 2019/0206106 A1    Jul. 4, 2019

Related U.S. Application Data

(60) Provisional application No. 62/611,428, filed on Dec. 28, 2017.

(51) Int. Cl.
*G06T 11/60* (2006.01)

(52) U.S. Cl.
CPC .................... *G06T 11/60* (2013.01)

(58) Field of Classification Search
CPC ....................................................... G06T 11/60
See application file for complete search history.

(56) References Cited

U.S. PATENT DOCUMENTS

| | | | | |
|---|---|---|---|---|
| 8,024,658 | B1* | 9/2011 | Fagans | G06Q 30/0621 715/243 |
| 8,762,889 | B2* | 6/2014 | Moore | G06F 3/048 715/838 |
| 2005/0141941 | A1* | 6/2005 | Narusawa | H04N 1/00132 400/76 |
| 2009/0287990 | A1* | 11/2009 | Lynton | G06F 16/4393 715/209 |

* cited by examiner

*Primary Examiner* — Phi Hoang
(74) *Attorney, Agent, or Firm* — Mannava & Kang, P.C.; Vinay Malik (57) ABSTRACT

Embodiments herein disclose methods and systems for decorating and embellishing interstitial space in a digital object layout using one or more design elements. Embodiments herein place one or more embellishments on any layout of 1-dimensional objects in a sequential manner by automatically detecting one or more "potential" regions/locations of placement (computed rectangular whitespace on edge, computed rectangular whitespace inside, geometric corners/vertices). One or more embellishments are placed in the one or more determined regions/locations using aesthetic measurements (measurement of nearest and furthest neighbor, chamfer radius around corners, number of objects overlaid on one side against the number of objects overlaid on the other side) and a rule based system. Embodiments herein disclose one or more specific design rules that enable a layout with embellishments to look aesthetically pleasing.

12 Claims, 12 Drawing Sheets

FIG. 1

Layout

= white space

METHODS AND SYSTEMS FOR DECORATING AND EMBELLISHING A DIGITAL OBJECT LAYOUT

CROSS REFERENCE TO RELATED APPLICATION

This application is based on and derives the benefit of U.S. Provisional Application 62/611,428 the contents of which are incorporated herein by reference.

TECHNICAL FIELD

The embodiments herein relate to visual graphic design and layouts in a layout and, more particularly, to arrangement of object in at least one pre-defined layout.

BACKGROUND

Given a visual layout of 1 to n objects on a layout, there is a design challenge in 'filling' the space which is typically left unoccupied (hereinafter referred to as interstitial space or whitespace or white space) by the objects. The whitespace can detract from the look of the surface area. This remaining 'whitespace' or interstitial space between the objects needs to be filled by design elements (hereinafter referred to as embellishments). These embellishments require discernment in placement on the layout so as to make them look aesthetically pleasing and balanced.

Figure 1:
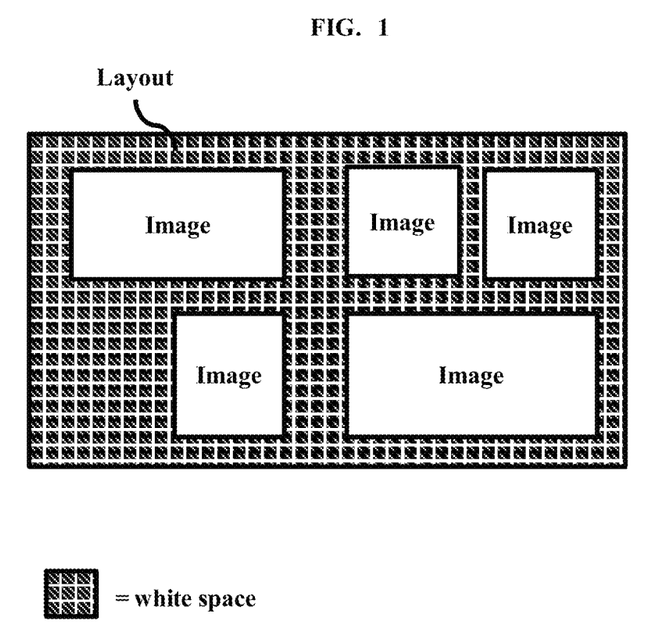
FIG. 1 depicts an example of whitespace in a page where one or more images have been placed.

In an example (as depicted in FIG. 1), consider that a plurality of images is being placed in a page of a image album. On placing all the images in the page, there may be unoccupied space present between the images. While one or more colors may be present in the background of the images on the page, the white space may detract from the overall look of the page.

BRIEF DESCRIPTION OF THE FIGURES

The embodiments disclosed herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose methods and systems for decorating and embellishing interstitial space in a digital object layout using one or more design elements. Referring now to the drawings, and more particularly to FIGS. 2A through 6, where similar reference characters denote corresponding features consistently throughout the figures, there are shown embodiments.

'Layout' as referred to herein can be a 'base' or 'background' 2-D geometric surface of any suitable shape, wherein one or more geometric objects are overlaid on the layout. Layouts can be a combination of at least one of statically predetermined layouts and dynamically generated layouts (wherein the dynamically generated layout can be dynamically generated at runtime). Layouts can comprise of different categories (also referred to herein as spread), such as front cover, back cover, first inside page, last inside page, one-page left, one-page right, two-page layout, 2-page layout crease compatible, and so on. Each layout can comprise of a configurable number of wells, wherein objects can be placed into the wells present in the layout. The layout can be of a pre-defined aspect ratio (H×W). The aesthetic characteristic of a layout can be described using a multi-dimensional vector, hereinafter referred to as an aesthetic vector. Examples of the geometric objects can be, but not limited to, rectangles, squares, circles, diamonds, and so on. Embodiments herein have used the terms 'layout', 'canvas' to indicate the layout interchangeably.

'Object' as referred to herein can refer to a 2-dimensional geometric object, which can be placed on a layout. In an embodiment herein, the user can provide the objects in real-time. In an embodiment herein, the objects can be fetched from a pre-defined location such as a local or remote database, a local file system, a remote file server, a data server, cloud storage, and so on. In an embodiment herein, a user can place one or more objects on the layout. In an embodiment herein, one or more objects can be placed automatically on the layout. Examples of the object can be, but not limited to, photos/images, paintings, sketches, drawings, graphic art, clip art, stickers, text, decorative text, and so on. Embodiments herein use an image as an example of an object for ease of explanation, however, it may be obvious to a person of ordinary skill in the art that embodiments as disclosed herein can be extended to any other type of object.

An embellishment as referred to herein can refer to an overlaid geometric article/design element, which can be placed on a layout, wherein the embellishment can be used for embellishing the layout. In an embodiment herein, the user can provide at least one embellishment. In an embodiment herein, at least one embellishment can be fetched from a pre-defined location such as a local or remote database, a local file system, a remote file server, a data server, cloud storage, and so on. In an embodiment herein, one or more embellishments can be placed automatically on the layout. Examples of the embellishment can be, but not limited to, edge bands and inside bands, strips, graphical stickers, clip art, graphical text, image frames image corner pieces, page corner pieces and so on. Each of these embellishments can have associated properties such as size properties (such as a default size, a minimum size, a maximum size, an aspect ratio, and so on), a relative size compared to an object (image) well on a layout, a relative size compared to the height or width of a page, a maximum angle of tilt, a maximum rotation angle, a z-plane altitude, a flippability along the vertical and/or horizontal axis, its principal anchor point on the layout, and so on. Embodiments herein refer to an embellishment using one of the following terms interchangeably: 'embellishment' and 'aset', wherein both the terms refer to an overlaid geometric article/design element, which can be placed on a layout.

Embodiments herein place one or more embellishments on any layout of 1-dimensional objects in a sequential manner by automatically detecting one or more 'potential' regions/locations of placement (computed rectangular whitespace on edge, computed rectangular whitespace inside, geometric corners/vertices). One or more embellishments are placed in the one or more determined regions/locations using aesthetic measurements (measurement of nearest and furthest neighbor, chamfer radius around corners, number of objects overlaid on one side against the number of objects overlaid on the other side) and a rule based system. Embodiments herein disclose one or more specific design rules that enable a layout with embellishments to look aesthetically pleasing.

Figure 2A:
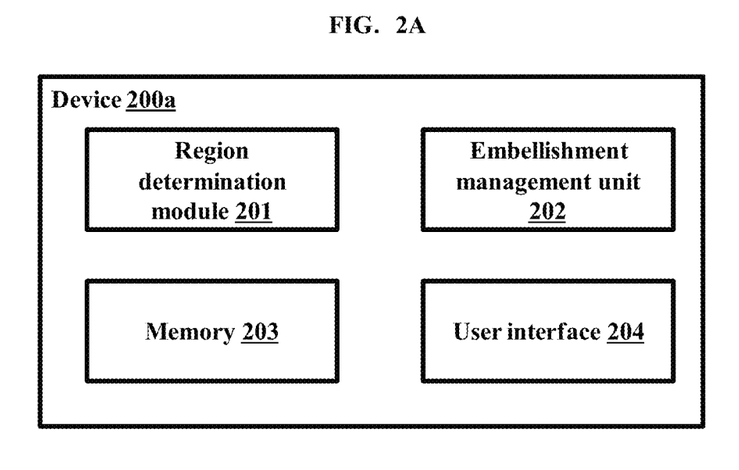
FIGS. 2A, and 2B depict a system for decorating and embellishing interstitial space in a digital object layout using one or more design elements (assets/embellishments), according to embodiments as disclosed herein.

FIGS. 2A, and 2B depict a system for decorating and embellishing interstitial space in a digital object layout using one or more design elements (assets/embellishments). The system 200, as depicted in FIG. 2A, can comprise a device 200a, which can further comprise a region determination module 201, an embellishment management unit 202, a memory 203, and at least one user interface 204. Examples of the device 200a can be, but not limited to, a laptop, a computer, a mobile phone, a tablet, a smart phone, an Internet of Things (IoT) device, a wearable computing device, a server, and so on.

Figure 2B:
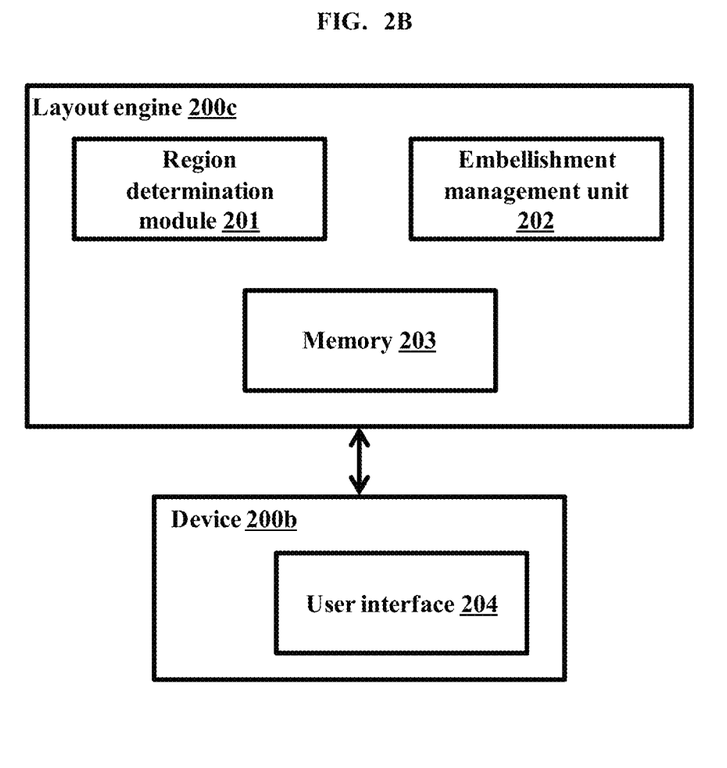

The system 200, as depicted in FIG. 2B, can comprise a device 201b comprising at least one user interface 204. The device 200b can be connected to a layout management engine 200c using at least one of a wired means and/or a wireless means. Examples of the layout management engine 200c can be, but not limited to, a database, a file system, a server, a file server, a data server, the Cloud, and so on. The layout engine 200c can further comprise a region determination module 201, an embellishment management unit 202, and a memory 203.

The user interface 204 can enable the user and/or an authorized user (such as an administrator) to provide at least one input. Examples of the user interface 204 can be, but not limited to, a display, a touchscreen, a keyboard, a mouse, and so on.

The memory 203 can comprise a plurality of embellishments, associated properties, and so on. The memory 203 can be at least one of a local memory, a distributed memory, a file server, a data server, the Cloud, a database, and so on. The memory 203 can comprise one or more criterion or specific locations where an embellishment can be placed on a layout with respect to other objects or other embellishments (hereinafter referred to as 'qualifying regions') (as depicted in the example in FIG. 5A). Examples of the qualifying regions can be edges, empty spaces, corners, and so on. FIGS. 5B, 5C, 5D, 5E and 5F depict example layouts wherein there are empty spaces/whitespaces, with various portions labelled. The memory 203 can also comprise one or more layouts, one or more objects (images) that can be placed in the layouts, one or more layouts with objects (images) placed in the layouts, and so on.

In an example, 'Image edge stickers' is an embellishment that can be applied on the 'edges' of an image. The edge of an image can be considered a 'qualifying region' for this specific asset type. Different types of edge types can be defined based upon the proximity of other objects in a layout. In an example herein, the qualifying region of a 'T-point sticker' can be close to the intersection point of multiple images (which can be 2 images, 3 images, n images, and so on). In an example herein, for a graphical sticker, the qualifying region can be the empty space between a plurality of images or the space between an image and the edge of a layout. In an example herein, the qualifying region for an image corner can be one or more corners of any image. In an example herein, the qualifying region for a page corner can have a qualifying region of one or more corner of the layout.

The region determination module 201 can identify one or more qualifying regions for each asset type. For a given layout, the region determination module 201 can compute all the possible target qualifying regions that are available to place one or more embellishments. In an example (as depicted in the examples in FIGS. 5D, 5E, and 5F), a particular layout may have 53 qualifying regions (12 free edges on the images, 2 partial free edges, 1 full shared edge, 10 free image corners, 2 Bound image corners, 8 partially free image corners, 4 horizontal outer empty spaces, 4 vertical empty spaces, 2 internal horizontal empty spaces, 4 outer page corners and 4 inner page corners).

Based on a list of qualifying regions (as provided by the region determination module 201), the embellishment management unit 202 can determine the embellishments that can be placed on any layout (wherein the layout can comprise of 1-n geometric objects (such as images, image wells, and so on)) in a manner that may be predetermined or generated based on a probability function. In an embodiment herein, a maximum number of embellishments that can be placed per layout can be pre-defined. In an embodiment herein, a minimum number of embellishments that can be placed per layout can be pre-defined. In an embodiment herein, a maximum number of a specific type of embellishments that can be placed per layout can be pre-defined. In an embodiment herein, a minimum number of a specific type of embellishments that can be placed per layout can be pre-defined. For example, there can be a minimum of 2 image corners per page, if possible and not to exceed a total of 4 image corners per page, if possible.

In an embodiment herein, each embellishment can have a weight assigned to it. The weight can depend on parameters such as, size of the embellishment, colour of the embellishment, possible locations for the embellishment, and so on. In an embodiment herein, the weight can be a substitute for the visual weight of an object on a layout. For example, a wide decorative band on layout that is 1 inch wide may have double the weight of a narrower band that is 0.3 inch wide. In an embodiment herein, the weight can be defined by an authorized user. In an embodiment herein, the weight can be determined automatically. Table 1 depicts an example table, which depicts various embellishments and their respective weights.

TABLE 1

| Asset type | Weight(s) |
| --- | --- |
| Image frames | 3 |
| Graphical stickers | 2 |
| Text stickers | 2 |
| Image edge stickers | 1 |
| Image corner stickers | 1.5 |
| Page corner stickers | 1.5 |
| T-point stickers | 1 |
| Bands | 3 |

The embellishment management unit 202 can determine a cumulative weight for the layout, wherein the cumulative weight can be the sum of weights of embellishments used in the layout. In an embodiment herein, a maximum cumulative weight per layout can be defined. In an embodiment herein, a minimum cumulative weight per layout can be defined. In an embodiment herein, a maximum cumulative weight for a specific type of embellishment per layout can be defined. In an embodiment herein, a minimum cumulative weight for a specific type of embellishment per layout can be defined.

The embellishment management unit 202 can use at least one of a sequential method for determining assets or a probabilistic method for determining assets or a combination of both the sequential method and the probabilistic method for determining assets.

In an embodiment herein, when the embellishment management unit 202 is using a sequential method for determining assets, the embellishment management unit 202 can determine a hierarchy of embellishments (which can be considered as a sequence to be followed). Examples of the hierarchy can be edge stickers are placed first, followed by image corners, followed by image frames, followed by graphic stickers, followed by text stickers and so on. Based on the number of embellishments that can be placed in the layout, the embellishment management unit 202 can sequentially place the embellishments (according to the determined hierarchy) in the layout.

In an embodiment herein, when the embellishment management unit 202 is using a probabilistic method for determining assets, the embellishment management unit 202 can use weighted probabilities to increase or decrease the likelihood of an asset being chosen for placement. Consider the weighted probabilities for the various embellishments as shown in Table 2, with a cumulative probability of 1.0.

TABLE 2

| Asset | Placement probability |
| --- | --- |
| Image frames | 0.15 |
| Graphical stickers | 0.15 |
| Text stickers | 0.15 |
| Image edge stickers | 0.1 |
| Image corner stickers | 0.15 |
| Page corner stickers | 0.05 |
| T-point stickers | 0.05 |
| Bands | 0.1 |

The embellishment management unit 202 can pick a particular asset to be used, based on its probability.

In an embodiment herein, when the embellishment management unit 202 is using the sequential method and the probabilistic method for determining assets, the embellishment management unit 202 can follow the determined hierarchy for placing the assets, based on the probabilities assigned to each of the assets.

In an embodiment herein, the embellishment management unit 202 can consider a degree of embellishment, for decorating and embellishing interstitial space in a digital object layout using one or more design elements. A user (who can be an end user or an authorized user (such as an administrator)) of this embellished layout may specify a desired degree of embellishment such as high, medium or low, wherein the degree of embellishment can be defined in terms of the cumulative weight. For example, a high degree of embellishment can have a cumulative weight target of 8 points and a low degree of embellishment can have a cumulative weight target of 4 points.

The embellishment management unit 202 can continually place assets onto the layout until a total cumulative weight target is reached for each degree of embellishment (high, medium, low). Having different targets enables the embellishment management unit 202 to modulate the number and size of the assets to be placed on the layout.

The embellishment management unit 202 can determine embellishments for multiple layouts present in the photobook. The embellishment management unit 202 can ensure that assets are repeated and/or not repeated at a specific rate (hereinafter referred to as a repetition rate). This rate can be different for different assets. For example, if a particular graphic sticker (say a "a set of suitcases") is used on the first page of a photobook/image story, the same graphic sticker is not used in the sequential pages until the say the 4th integer multiple of pages. So, if a graphic sticker of a set of suitcases is used on page 3, then next time this graphic sticker could be used in the image book/image story would be the 7th page, 11th page and so on. In another example, say the rate for repeating a particular type of image frame is set at an integer multiple of 3, then that type of image frame could be used only the 1st, 4th, 7th, 10th page and so on.

Figure 6:
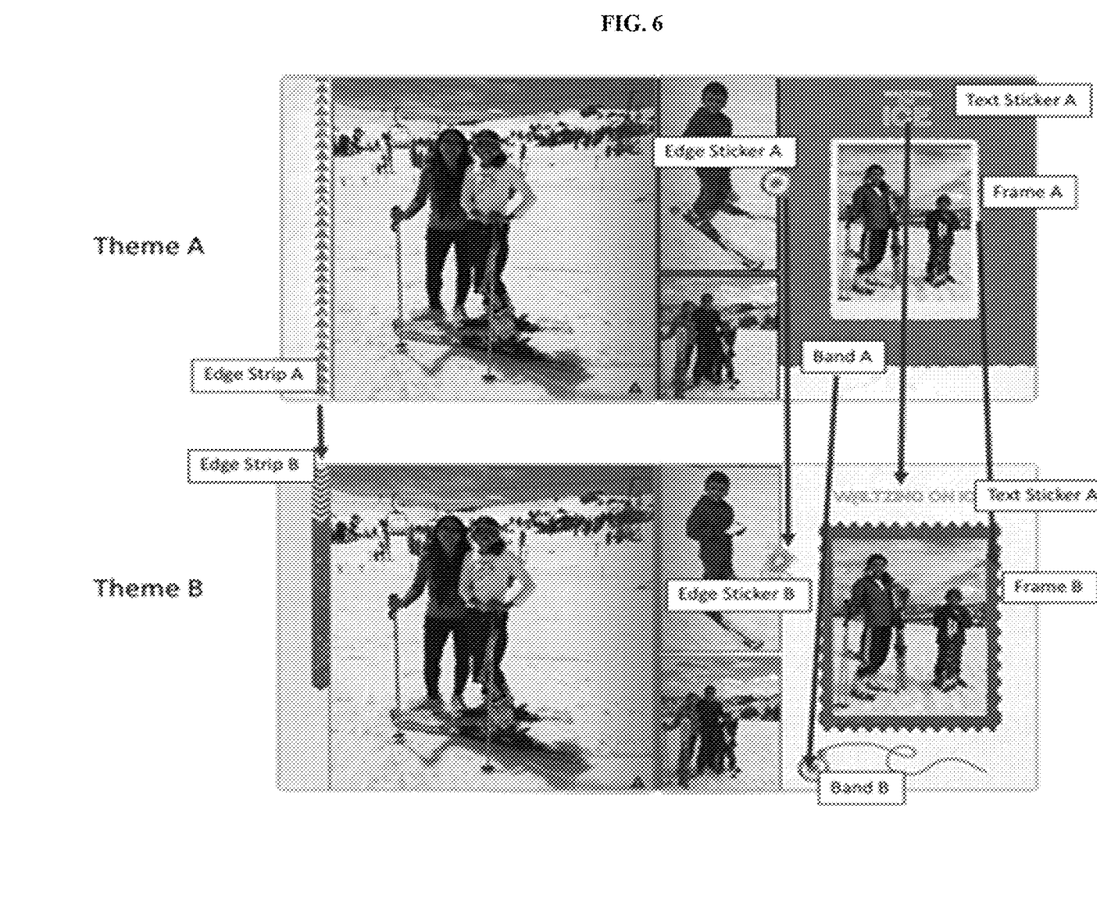
FIG. 6 depicts an example layout, wherein one design theme present in a layout is transformed into another theme, according to embodiments as disclosed herein.

The embellishment management unit 202 can transform one design theme present in a layout into another theme (as shown in the example in FIG. 6). The embellishment management unit 202 can perform consistent 1-to-1 mapping of all assets belonging to a first theme with a similar pairing asset from another theme. Considering the example depicted in FIG. 6, image frames in theme A will be replaced by image frames in theme B, a band asset in theme A will be replaced with a band asset in the theme B, an image edge strip in theme A will be replaced by an image edge strip in theme B and so on.

Figure 3:
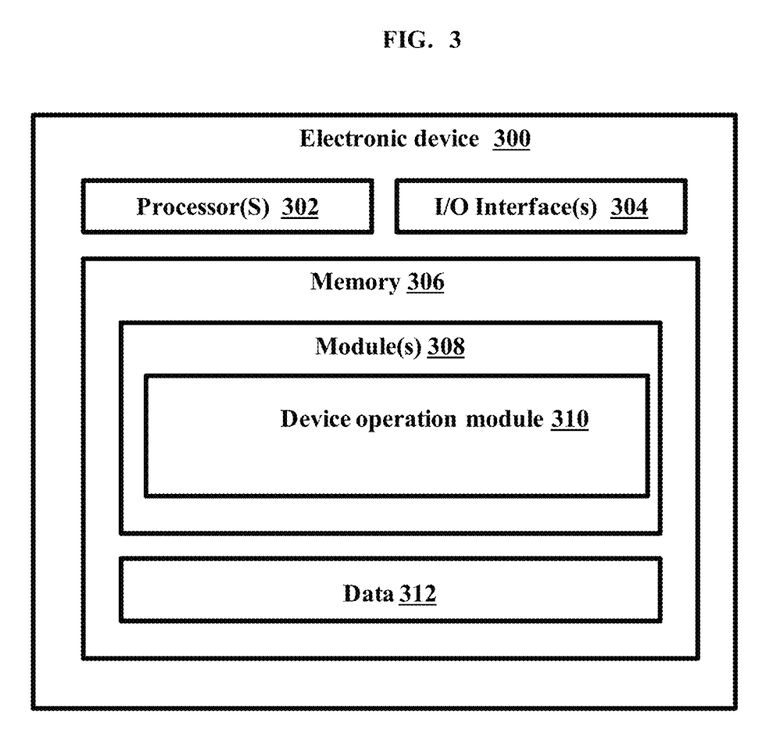
FIG. 3 is a block diagram illustrating a plurality of components of an electronic device 300 for decorating and embellishing interstitial space in a digital object layout using one or more embellishments, according to embodiments as disclosed herein.

FIG. 3 is a block diagram illustrating a plurality of components of an electronic device 300 for decorating and embellishing interstitial space in a digital object layout using one or more embellishments. The device 300 can be any device that can create and manage a digital object layout. Examples of the device 300 can be, but not limited to, a computer, a laptop, a smart phone, a mobile phone, a tablet, a wearable device, a server, the Cloud, and so on.

Referring to FIG. 3, the electronic device 300 is illustrated in accordance with an embodiment of the present subject matter. In an embodiment, the electronic device 300 may include at least one processor 302, an input/output (I/O) interface 304 (herein a configurable user interface), and a memory 306. The at least one processor 302 may be implemented as one or more microprocessors, microcomputers, microcontrollers, digital signal processors, central processing units, state machines, logic circuitries, and/or any devices that manipulate signals based on operational instructions. Among other capabilities, the at least one processor 302 is configured to fetch and execute computer-readable instructions stored in the memory 306.

The I/O interface 304 may include a variety of software and hardware interfaces; for example, a web interface, a graphical user interface such as a display screen, a physical interface, and the like. The I/O interface 304 may allow the electronic device 300 to communicate with other devices. The I/O interface 304 may facilitate multiple communications within a wide variety of networks and protocol types, including wired networks, for example, Local Area network (LAN), cable, etc., and wireless networks, such as Wireless LAN, cellular, Device to Device (D2D) communication network, Wi-Fi networks and so on. The modules 308 include routines, programs, objects, components, data structures, and so on, which perform particular tasks, functions or implement particular abstract data types. In one implementation, the modules 308 may include a device operation module 310. The device operation module 310 can be configured to allow the user to handle one or more tasks of the application for decorating and embellishing interstitial space in a digital object layout using one or more embellishments. The device operation module 310 can be configured to decorating and embellishing interstitial space in a digital object layout using one or more embellishments. The device operation module 310 can be configured to execute one or more tasks corresponding to the application on the electronic device 300 in accordance with embodiments as disclosed herein.

The memory 306 may include one or more computer-readable storage media. The memory 306 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 306 may, in some examples, be considered a non-transitory storage medium. The term "non-transitory" may indicate that the storage medium is not embodied in a carrier wave or a propagated signal. However, the term "non-transitory" should not be interpreted to mean that the memory 306 is non-movable. In some examples, the memory 306 can be configured to store larger amounts of information/data 312 than the memory. In certain examples, a non-transitory storage medium may store data that can, over time, change (e.g., in Random Access Memory (RAM) or cache).

The memory 306 can comprise a plurality of embellishments, associated properties, and so on. The memory 306 can comprise one or more criterion or specific qualifying regions. The memory 306 can also comprise one or more layouts, one or more objects (images) that can be placed in the layouts, one or more layouts with objects (images) placed in the layouts, and so on.

The device operation module 310 can identify one or more qualifying regions for each asset type. For a given layout, the region determination module 201 can compute all the possible target qualifying regions that are available to place one or more embellishments. Based on a list of qualifying regions, the device operation module 310 can place the embellishments on any layout (wherein the layout can comprise of 1-n geometric objects (such as images, image wells, and so on)) in a manner that may be predetermined or generated based on a probability function. In an embodiment herein, The device operation module 310 can assign a weight to each asset. The device operation module 310 can determine a cumulative weight for the layout, as the sum of weights of embellishments used in the layout. The device operation module 310 can use at least one of the sequential method of placing assets or the probabilistic method or the combination of both the sequential method and the probabilistic method. The device operation module 310 can consider a degree of embellishment, for decorating and embellishing interstitial space in a digital object layout using one or more design elements. The device operation module 310 can continually place assets onto the layout until a total cumulative weight target is reached for each degree of embellishment (high, medium, low). The device operation module 310 can modulate the number and size of the assets to be placed on the layout.

The device operation module 310 can determine embellishments for multiple layouts present in the photobook. The device operation module 310 can ensure that assets are repeated and/or not repeated at a specific rate. The device operation module 310 can transform one design theme present in a layout into another theme by performing a consistent 1-to-1 mapping of all assets belonging to a first theme with a similar pairing asset from another theme.

Figure 4:
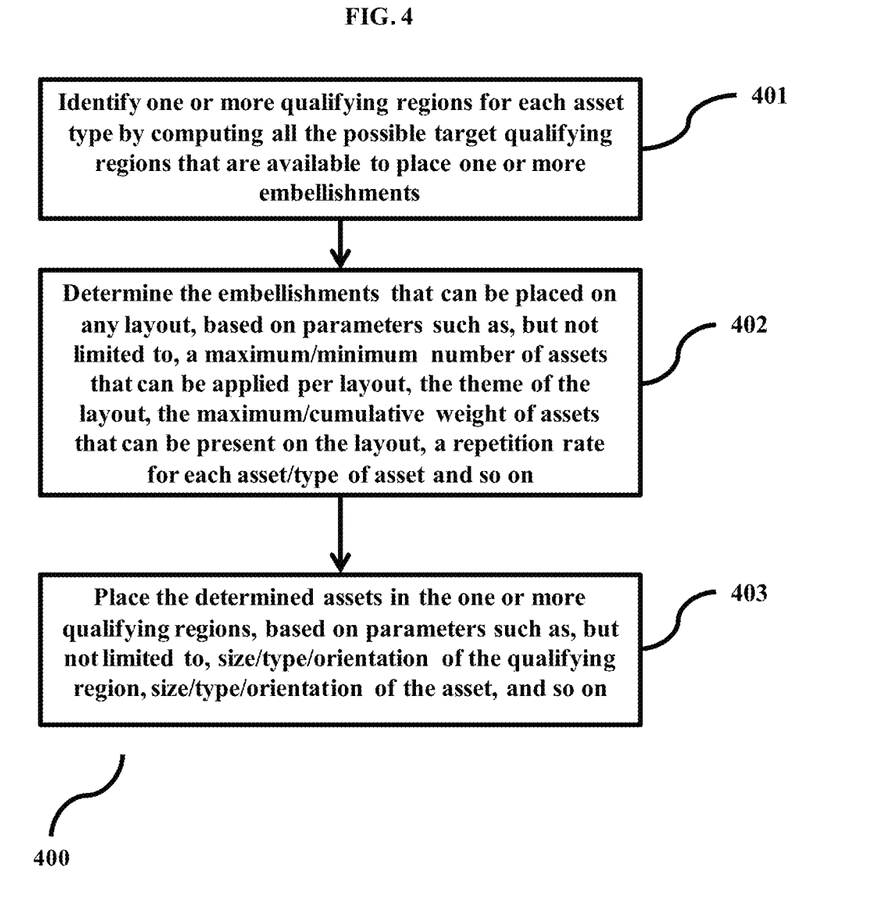
FIG. 4 is a flowchart depicting the process of decorating and embellishing interstitial space in a digital object layout using one or more design elements (assets/embellishments), according to embodiments as disclosed herein.
Figure 5A:
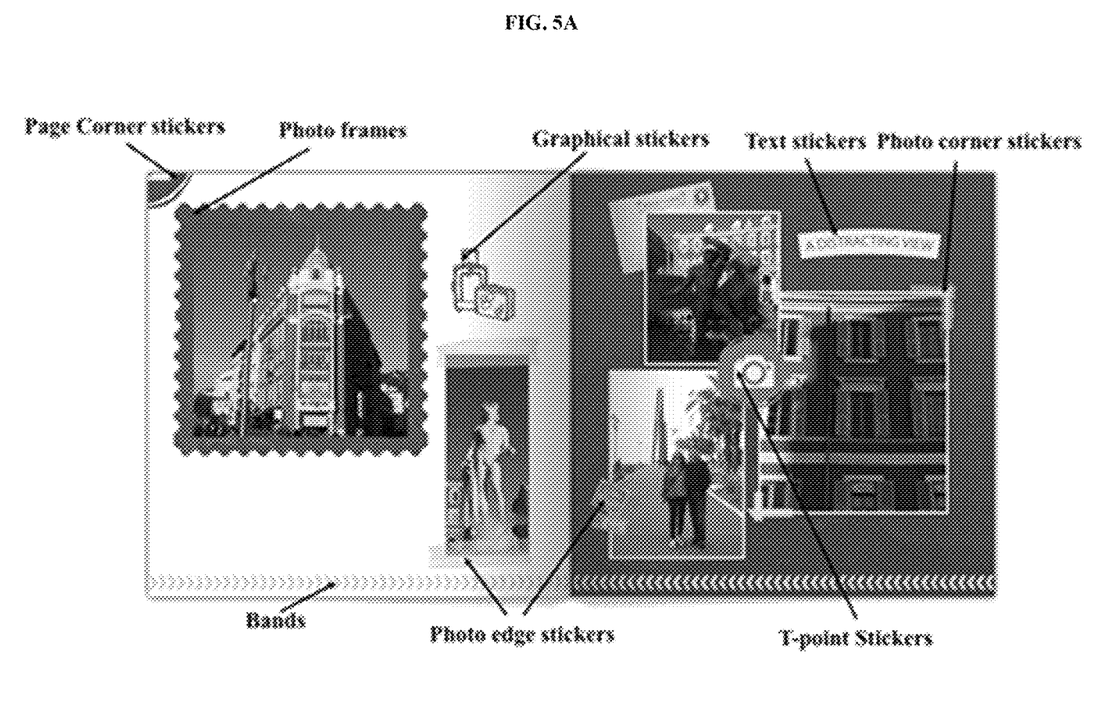
FIGS. 5A-5F depicts example layout and example qualifying regions, according to embodiments as disclosed herein.
Figure 5B:
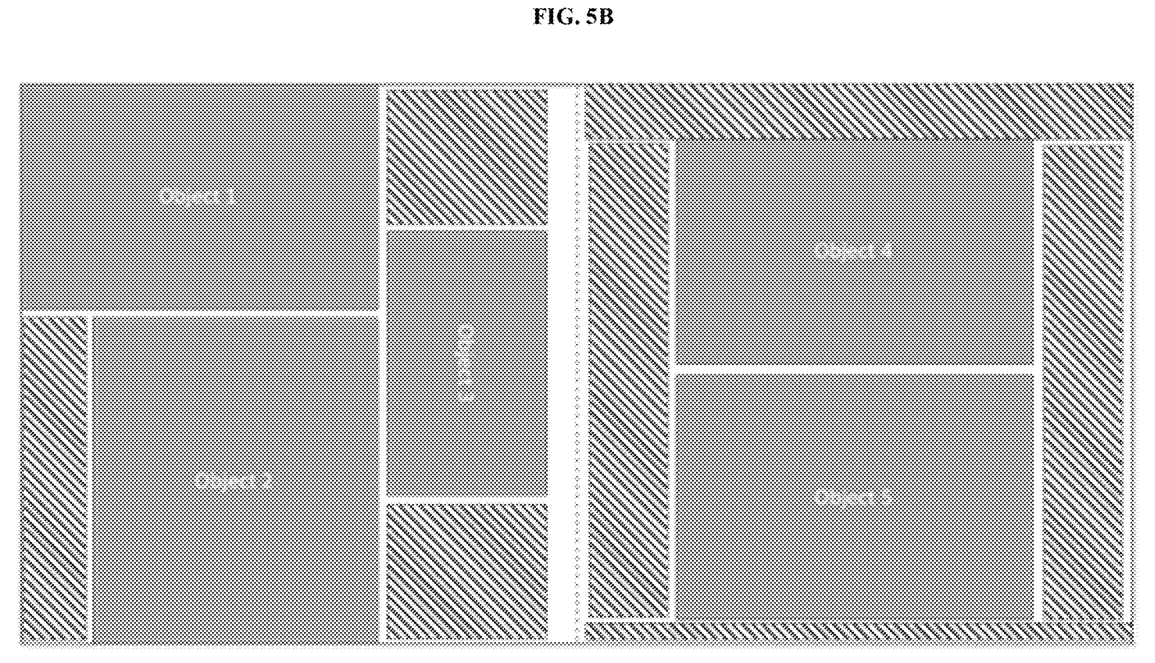
Figure 5C:
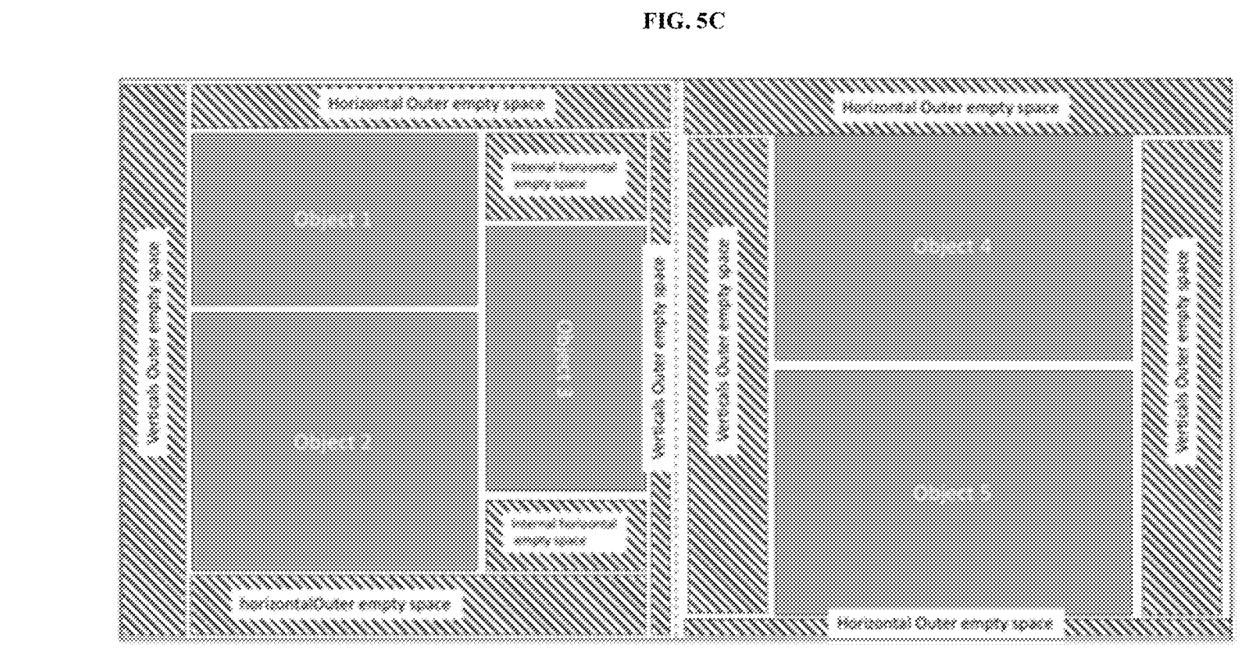
Figure 5D:
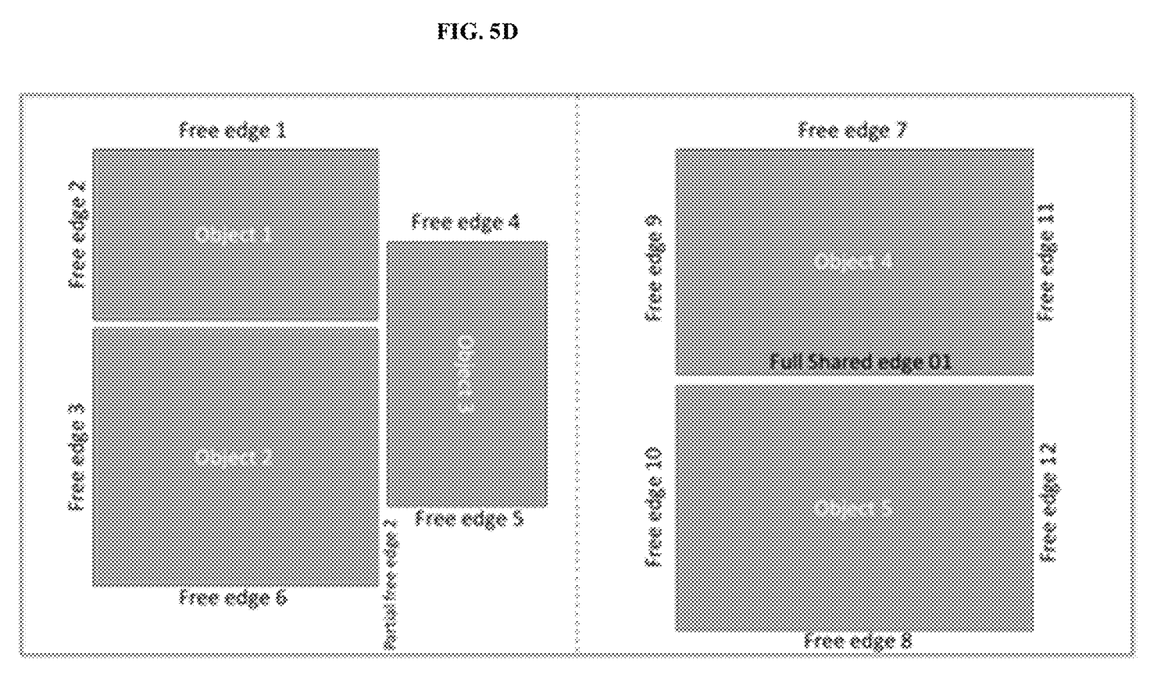
Figure 5E:
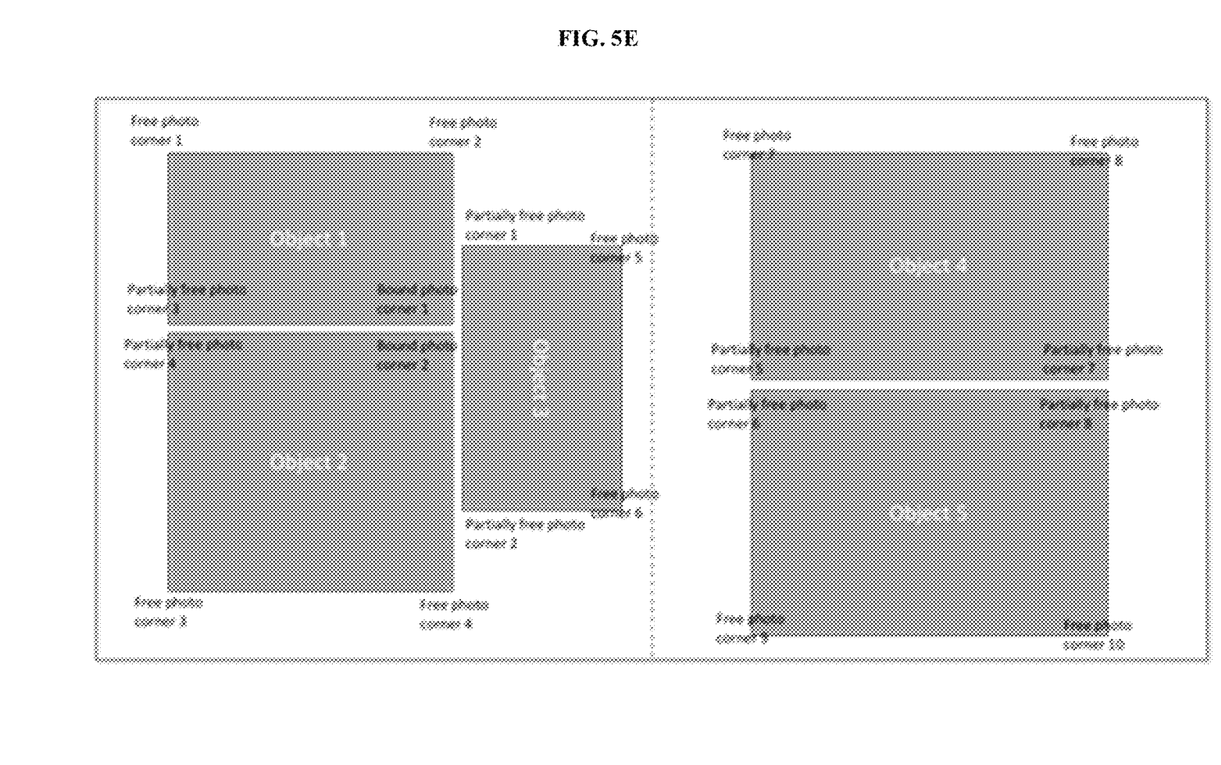
Figure 5F:
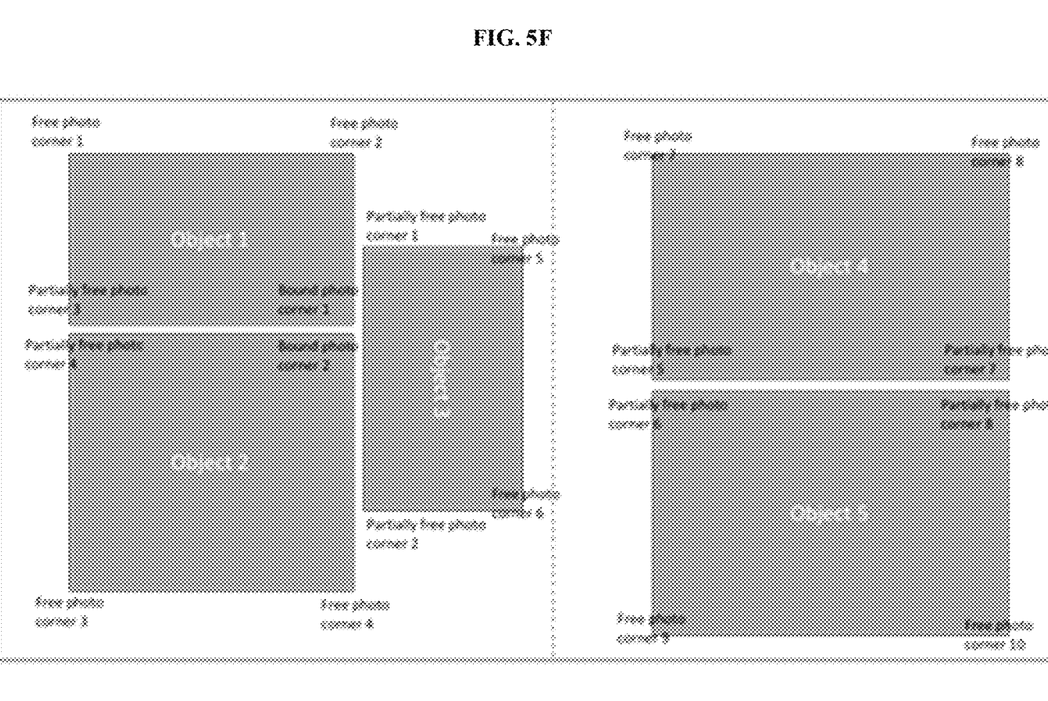

FIG. 4 is a flowchart depicting the process of decorating and embellishing interstitial space in a digital object layout using one or more design elements (assets/embellishments). The region determination module 201 identifies (401) one or more qualifying regions for each asset type by computing all the possible target qualifying regions that are available to place one or more embellishments. In an example (as depicted in the examples in FIGS. 5D, 5E, and 5F), a particular layout may have 53 qualifying regions (12 free edges on the images, 2 partial free edges, 1 full shared edge, 10 free image corners, 2 Bound image corners, 8 partially free image corners, 4 horizontal outer empty spaces, 4 vertical empty spaces, 2 internal horizontal empty spaces, 4 outer page corners and 4 inner page corners). Based on a list of qualifying regions (as provided by the region determination module 201), the embellishment management unit 202 determines (402) the embellishments that can be placed on any layout, based on parameters such as, but not limited to, a maximum/minimum number of assets that can be applied per layout, the theme of the layout, the maximum/cumulative weight of assets that can be present on the layout, a repetition rate for each asset/type of asset and so on. The embellishment management unit 202 uses at least one of a sequential method of determining assets or a probabilistic method for determining assets or a combination of both the sequential method and the probabilistic method for determining assets. On determining the assets to be placed in the layout, the embellishment management unit 202 places (403) the determined assets in the one or more qualifying regions, based on parameters such as, but not limited to, size/type/orientation of the qualifying region, size/type/orientation of the asset, and so on. The embellishment management unit 202 can perform one or more operations on the assets (such as rotation, scaling, flipping, and so on), before placing the assets on the layout. The embellishment management unit 202 can repeat the above mentioned steps for the layouts present in the imagebook/story. The various actions in method 400 may be performed in the order presented, in a different order or simultaneously. Further, in some embodiments, some actions listed in FIG. 4 may be omitted.

Embodiments herein allow any layout to be automatically embellished without the need for human judgment. For example, embodiments herein can be used in the creation of a coffee table photo book, a digital photo narrative with photo layouts, a calendar, a collage, a power point presentation, a poster, a greeting card, and so on.

The embodiments disclosed herein can be implemented through at least one software program running on at least one hardware device and performing network management functions to control the network elements. The network elements shown in FIGS. 2A, 2B, and 3 include blocks, which can be at least one of a hardware device, or a combination of hardware device and software module.

The embodiment disclosed herein specifies a system for decorating and embellishing interstitial space in a digital object layout using one or more design elements (assets/embellishments). Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments herein can be practiced with modification within the spirit and scope of the claims as described herein.

What is claimed is:

1. A method for placing at least one embellishment onto a digital layout, the method comprising:
   identifying, by a region determination module, one or more qualifying regions in the digital layout for each type of embellishment;
   determining automatically, by an embellishment management unit, at least one embellishment that can be placed in at least one of the identified qualifying regions, wherein the embellishment management unit uses at least one of a sequential method, a probabilistic method or a combination of both the sequential method and the probabilistic method for determining the at least one embellishment that can be placed in at least one of the identified qualifying regions, wherein the at least one embellishment has an associated weight, wherein the associated weight depends on one or more parameters and is defined by an authorized user, wherein the one or more parameters comprises one or more of size of the at least one embellishment, colour of the at least one embellishment, and possible locations for the at least one embellishment;
   receiving, by the embellishment management unit, from the authorized user, a degree of embellishment defined in terms of cumulative weight, wherein the degree of embellishment is one of high, medium, and low; and
   continually placing the at least one determined embellishment onto the digital layout until a total cumulative weight target is reached for each degree of embellishment.

2. The method, as claimed in claim 1, wherein the method comprises determining the at least one embellishment that can be placed in at least one of the identified qualifying regions using the sequential method based on a hierarchy of embellishments.

3. The method, as claimed in claim 1, wherein the probabilistic method comprises using weighted probabilities to increase or decrease the likelihood of an embellishment being determined.

4. The method, as claimed in claim 1, wherein the method comprises determining, by the embellishment management unit, the at least one embellishment that can be placed in at least one of the identified qualifying regions using the degree of embellishment.

5. The method, as claimed in claim 1, wherein the method comprises determining, by the embellishment management unit, the at least one embellishment that can be placed in at least one of the identified qualifying regions based on a repetition rate.

6. The method, as claimed in claim 1, wherein the method further comprises transforming a first theme present in a layout into another theme by performing consistent one-to-one mapping of all embellishments belonging to the first theme with a pairing asset from another theme.

7. A system for placing at least one embellishment onto a digital layout, the system comprising a processor, a user interface, and a memory, wherein the system is configured to:
   identify one or more qualifying regions in the digital layout for each type of embellishment;
   determine automatically at least one embellishment that can be placed in at least one of the identified qualifying regions, wherein the embellishment management unit uses at least one of a sequential method, a probabilistic method or a combination of both the sequential method and the probabilistic method for determining the at least one embellishment that can be placed in at least one of the identified qualifying regions, wherein the at least one embellishment has an associated weight, wherein the associated weight depends on one or more parameters and is defined by an authorized user, wherein the one or more parameters comprises one or more of size of the at least one embellishment, colour of the at least one embellishment, and possible locations for the at least one embellishment;
   receive from the authorized user, a degree of embellishment defined in terms of cumulative weight, wherein the degree of embellishment is one of high, medium, and low; and
   continually place the at least one determined embellishment onto the digital layout until a total cumulative weight target is reached for each degree of embellishment.

8. The system, as claimed in claim 7, wherein the system is configured for determining the at least one embellishment that can be placed in at least one of the identified qualifying regions using the sequential method based on a hierarchy of embellishments.

9. The system, as claimed in claim 7, wherein the probabilistic method comprises using weighted probabilities to increase or decrease the likelihood of an embellishment being determined.

10. The system, as claimed in claim 7, wherein the system is configured for determining the at least one embellishment that can be placed in at least one of the identified qualifying regions using the degree of embellishment.

11. The system, as claimed in claim 7, wherein the system is configured for determining the at least one embellishment that can be placed in at least one of the identified qualifying regions based on a repetition rate.

12. The system, as claimed in claim 7, wherein the system is further configured for transforming a first theme present in a layout into another theme by performing consistent one-to-one mapping of all embellishments belonging to the first theme with a pairing asset from another theme.

* * * * *